UNITED STATES PATENT OFFICE 2,459,059

METHOD FOR PREPARING ALKYL ACYLOXY ACRYLATES

Robert D. Babson, Rahway, N. J., assignor to Merck & Co., Inc., Rahway, N. J., a corporation of New Jersey No Drawing. Application July 12, 1946, Serial No. 683,143

2 Claims. (Cl. 260—484)

This invention is concerned generally with novel chemical processes; more particularly it relates to an improved method for the manufacture of esters $\alpha$-halo-$\beta,\beta$-dialkoxy-propionic acid, useful in the preparation of $\alpha$-formyl-phenaceturamide, a primary intermediate in the synthesis of penicillin.

It is now discovered, in accordance with the present invention, that $\alpha$-halo-$\beta,\beta$-dialkoxy-propionic esters can be synthesized by reactions indicated as follows:

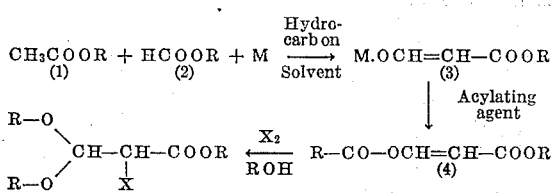

wherein R is alkyl, M is an alkali metal, and X is halogen.

The reactions indicated above are conducted as follows: An alkyl acetate (1) is reacted with an alkyl formate (2) and an alkali metal to produce the corresponding alkyl $\alpha$-(metallo-formyl) acetate (3); this compound is reacted wtih an acylating agent derived from an aliphatic carboxylic acid to produce the corresponding alkyl $\beta$-acyloxy-acrylate (4) said alkyl $\beta$-acyloxy acrylate is then reacted with a halogen and an aliphatic alcohol to produce the corresponding alkyl $\alpha$-halo-$\beta,\beta$-dialkoxy-propionate (5). Compounds of this class can be converted to esters of $\alpha$-phenacetamido-$\beta,\beta$-dialkoxy-propionate as follows: The alkyl $\alpha$-halo-$\beta,\beta$-dialkoxy-propionate is hydrolyzed and the resulting $\alpha$-halo-$\beta,\beta$-dialkoxy-propionic acid is heated with aqueous ammonia, whereby the $\alpha$-halo substituent is converted to an $\alpha$-amino group; the $\alpha$-amino-$\beta,\beta$-dialkoxy propionic acid is then reacted with a phenacyl halide and the product esterified to produce the desired ester of $\alpha$-phenacetamido-$\beta,\beta$-dialkoxy propionate. These reactions are described in detail in co-pending applications, Serial No. 728,724, filed February 14, 1947, and Serial No. 710,945, filed November 19, 1946. For example methyl acetate can be condensed with methyl formate and sodium to form methyl $\alpha$-(sodioformyl)-acetate; this can then be treated with acetyl chloride to produce methyl $\beta$-acetoxy-acrylate. When this compound is reacted with chlorine and methyl alcohol, and the product obtained treated as described in the above co-pending applications, the product is methyl $\alpha$-phenacetamido-$\beta,\beta$-dimethoxy propionate. It is converted to $\alpha$-formyl-phenaceturamide according to processes described in detail in copending application, Serial No. 636,516, filed December 21, 1945.

Prior art methods showing the reaction of $\alpha$-sodioformyl)-acetate with acetyl chloride are known, but in these processes, the reaction mixture is distilled directly, which procedure results in considerable decomposition and polymerization of the product and the resulting yield of ethyl $\beta$-acetoxy-acrylate is limited to approximately 22% of theory. No process is disclosed in the prior art for converting alkyl $\beta$-acyloxy-acrylates to alkyl $\alpha$-halo-$\beta,\beta$-dialkoxy propionates.

It is now discovered, according to the present invention, that an alkyl $\alpha$-(metallo-formyl)-acetate can be reacted with an aliphatic acyl halide and the reaction product neutralized to a pH of approximately 6–7 and then distilled, whereby the corresponding alkyl $\beta$-acyloxy acrylate is obtained in yields of nearly 60% of theory. It is further discovered that these alkyl $\beta$-acyloxy acrylates can be reacted with a halogen and an aliphatic alcohol to produce the desired alkyl $\alpha$-halo-$\beta,\beta$-dialkoxy propionates in yields of over 80% of theory.

In carrying out the reaction, the alkyl $\alpha$-(metallo-formyl)-acetate is reacted with an aliphatic acyl halide such as acetyl chloride, propionyl bromide, butyryl chloride and the like, in dialkyl ether solution. The time for the reaction varies, depending upon the reactants and the temperature employed, from approximately ½ hour to several hours. It is presently preferred to employ temperatures of approximately 35° C.; at this temperature, the reaction in the case of ethyl $\alpha$-(sodio-formyl)-acetate and acetyl chloride is substantially complete in approximately ½ hour. The reaction mixture is neutralized to a pH of approximately 7, for example, by shaking with an aqueous solution containing a mild alkaline agent such as sodium bicarbonate or potassium bicarbonate. The ether layer is separated, washed with water, and ether evaporated and the residual oil distilled, preferably under reduced pressure to produce the alkyl $\beta$-acyloxy acrylate.

The following example illustrates a method of carrying out the present invention, but it is to be understood that this example is given by way of illustration and not of limitation.

Example

A mixture of about 155 g. of ethyl $\alpha$-sodioformyl acetate and about 700 cc. of anhydrous ether is cooled to approximately −10° C. About 80.2 cc. of acetyl chloride is added to this mixture with stirring over approximately a 5 minute period, during which time the temperature is allowed to rise to about 35° C. The reaction mixture is stirred for approximately ½ hour additional time and is then poured into an equal volume of ice water containing an excess of sodium bicarbonate. The layers are separated, the water layer extracted with ether and the combined ether layers washed once with water and dried over sodium sulfate and the ether evaporated under reduced pressure. The residue is distilled under reduced pressure to produce approximately 106 g. of ethyl β-acetoxy-acrylate; B. P. 94–97° C. at 18 mm.; $n^{25}$=1.4459; yield approximately 60% of theory based on ethyl α-sodio-formyl acetate.

Modifications may be made in carrying out the present invention without departing from the spirit and scope thereof and it is to be understood that the invention is to be limited only by the appended claims.

I claim:

1. The process which comprises reacting, in dialkyl ether solution, an alkyl α-metallo-formyl-acetate with a lower aliphatic carboxylic acid halide, directly neutralizing the reaction mixture to a pH of approximately 7 and recovering the corresponding alkyl β-acyloxy-acrylate from said neutralized reaction mixture.

2. The process which comprises reacting, in diethyl ether solution, ethyl α-sodio-formyl acetate with acetyl chloride, directly neutralizing the reaction mixture to a pH of approximately 7 with aqueous sodium bicarbonate solution and recovering ethyl β-acetoxy acrylate from said neutralized reaction mixture.

ROBERT D. BABSON.

REFERENCES CITED

The following references are of record in the file of this patent:

UNITED STATES PATENTS

| Number | Name | Date |
|---|---|---|
| 2,390,335 | Sobotka et al. | Dec. 4, 1945 |
| 2,394,255 | Northey | Feb. 5, 1946 |
| 2,405,820 | Faith | Aug. 13, 1946 |

OTHER REFERENCES

Pechmann: "Ber. Deut. Chem. Ges.," vol. 25 (1892), pages 1047–1051.

Wislicenus et al.: "Liebigs Annalen," vol. 316 (1901), pages 18, 26, 27, 37 and 39.

Wislicenus: "Ber. Deut. Chem.," vol. 43 (1910), page 3531.

Sugasawa, "Chem. Zent.," (1927), part II, page 1814.

Oroshnik et al.: "Journal American Chemical Society," vol. 67 (May 1945), pages 722–723.

Merck Report, 12d, February 18, 1944 (Sept. 27, 1945), page 5.